United States Patent [19]
Tavlarides et al.

[11] Patent Number: 5,779,906
[45] Date of Patent: Jul. 14, 1998

[54] METHOD OF REMOVING HEAVY METAL IONS FROM A LIQUID WITH CHEMICALLY ACTIVE CERAMIC COMPOSITIONS WITH A PYROGALLOL MOIETY

[75] Inventors: Lawrence L. Tavlarides, Fayetteville; Nandu Deorkar, Syracuse, both of N.Y.

[73] Assignee: Syracuse University, Syracuse, N.Y.

[21] Appl. No.: 791,477

[22] Filed: Jan. 27, 1997

Related U.S. Application Data

[62] Division of Ser. No. 312,875, Sep. 27, 1994, Pat. No. 5,624,881.

[51] Int. Cl.$^6$ .................................................. B01D 15/00
[52] U.S. Cl. .................. 210/661; 210/670; 210/379; 210/682; 210/688
[58] Field of Search .................. 210/661, 669, 210/670, 679, 682, 688, 912, 913, 914

[56] References Cited

U.S. PATENT DOCUMENTS

| | | | |
|---|---|---|---|
| 3,886,080 | 5/1975 | Schucker et al. | 252/176 |
| 4,377,555 | 3/1983 | Hancock et al. | 423/6 |
| 4,421,654 | 12/1983 | Plueddemann | 210/698 |
| 4,448,694 | 5/1984 | Plueddemann | 210/682 |
| 4,585,559 | 4/1986 | DeVoe et al. | 210/679 |
| 4,623,638 | 11/1986 | Hayatsu et al. | 502/401 |
| 4,752,398 | 6/1988 | Holbein et al. | 210/679 |
| 4,756,971 | 7/1988 | Virtanen et al. | 428/405 |
| 4,824,576 | 4/1989 | Sood et al. | 210/662 |
| 4,943,375 | 7/1990 | Bradshaw et al. | 210/674 |
| 4,952,321 | 8/1990 | Bradshaw et al. | 210/670 |
| 4,959,153 | 9/1990 | Bradshaw et al. | 210/670 |
| 4,968,434 | 11/1990 | Kaneko et al. | 210/682 |
| 4,975,379 | 12/1990 | Bradshaw et al. | 436/77 |
| 5,039,419 | 8/1991 | Bradshaw et al. | 210/502.1 |
| 5,049,280 | 9/1991 | Raymond et al. | 210/688 |
| 5,078,978 | 1/1992 | Tarbet et al. | 423/22 |
| 5,120,443 | 6/1992 | Bruening et al. | 210/638 |
| 5,175,110 | 12/1992 | Bradshaw et al. | 436/77 |
| 5,190,660 | 3/1993 | Lindoy et al. | 210/670 |
| 5,190,661 | 3/1993 | Bruening et al. | 210/670 |
| 5,316,683 | 5/1994 | Haesbroek et al. | 210/688 |

OTHER PUBLICATIONS

Nakamura et al., 15 *J. Nucl. Sci. and Tech.*, 829–834 (1978).

*Primary Examiner*—Ivars Cintins
*Attorney, Agent, or Firm*—Nixon, Hargrave, Devans & Doyle LLP

[57] ABSTRACT

Novel ceramic compositions are used for removing metal ions by chelation from solutions such as aqueous waste streams. The compositions are formed by covalently bonding to terminal hydroxy groups of a ceramic inorganic carrier or support a substituted silane linking group attached to a chelating agent or ligand which is pyrogallol or a derivative thereof.

24 Claims, 4 Drawing Sheets

METHOD OF REMOVING HEAVY METAL IONS FROM A LIQUID WITH CHEMICALLY ACTIVE CERAMIC COMPOSITIONS WITH A PYROGALLOL MOIETY

This is a divisional of U.S. application Ser. No. 08/312,875 filed Sep. 27, 1994, now U.S. Pat. No. 5,624,881.

This invention was made with Government support under Contract #R818630-01-1, awarded by the Environmental Protection Agency. The Government has certain right in the invention.

The present invention relates to novel chemically active ceramic compositions and to the preparation of and use of such compositions for removing metal ions from solutions, especially aqueous waste streams.

BACKGROUND OF THE INVENTION

Many industries utilize heavy metals and/or rare earth metals in their manufacturing processes. Such use typically results in liquid (generally aqueous) waste streams that contain residues of the rare earth or heavy metals utilized in the given manufacturing process. For example, the waste streams resulting from electronics, electroplating, and photographic processes typically contain metal ions such as copper, nickel, zinc, chromium (III), chromium (VI), cadmium, aluminum, lead, antimony, silver and gold, amongst others in various aqueous solutions such as sulfates, chlorides, fluoroborates and cyanides. Because of the potential adverse effect of such substances on health and the environment, the removal of rare earth metals and heavy metal ions from aqueous waste streams is a problem of continuing significance.

For the purposes of the present invention, heavy metals will be defined generally as elements having atomic numbers greater than 20, as defined by the Periodic Chart of the Elements and are metallic at ambient conditions. Rare earth metals are defined as those heavy metals having atomic numbers 57 through 71 inclusive. Actinides are those heavy metals having atomic numbers greater than 89. For example, aluminum, arsenic, antimony, copper, nickel, zinc, chromium, cadmium, mercury, platinum, palladium and gold are all heavy metals typically found in the waste stream of common manufacturing processes. In addition, cesium and strontium (and other radioactive metals) are found in aqueous waste streams in the nuclear industry.

The conventional and predominant method of treatment of the aqueous streams described above is the precipitation of the metal ions in the form of hydroxides or carbonates. That method of removing heavy metals is largely undesirable because it results in a sludge that is difficult and/or expensive to remove and separate from the waste stream. Furthermore, the recovered sludge is typically deposited in a hazardous waste site, raising additional environmental concerns. Finally, it is difficult to separate the individual metal from the resultant sludge for recycling back into the manufacturing process. Other recovery methods include evaporation, reverse osmosis, ion exchange, electrolytic metal recovery, and solvent extraction. These methods, however, have varying levels of success and do not typically allow for the quick and inexpensive separation and removal of the individual metals from the waste streams.

Another common technique for the separation and recovery of rare earths is solvent extraction. However, the main difficulty in a solvent extraction recovery process arises from the low concentration at which these metal ions exist in the aqueous stream generated from hydrometallurgical processes. Also, the identical complexing behavior of all the rare earths due to their similar ionic sizes and chemistry limits the ability to separate out the individual rare earth metals from the sample collected in the solvent extraction process. See Nakamura, Tachimori and Sato, 15 *Journal of Nuclear Science and Technology*, 829–834 (1978).

A more recent method of removing metals from waste streams features using compositions which include chelating agents that are bound to inorganic carriers. Chelating agents, also known as multidentate ligands, are compounds which are capable of complexing with various metal ions in solution where one chelation molecule has the capacity to attach a metal ion at two or more positions. Those chelating agents are molecules which contain one or more of the same donor atom (e.g., "electron sufficient" atoms such as oxygen, nitrogen, sulfur etc.) or two or more different donor atoms through which coordinate and/or covalent bonds are formed between the metal ion and chelating agent. One such composition is disclosed in U.S. Pat. No. 3,886,080 to Schucker et al. ("Schucker"). Schucker discloses a composition in which a specific type of chelating agent (i.e. oxine, dithizone, neocuproine O-phenanthroline, or salicylaldoxine) has been rendered immobile or insoluble by bonding the chelating agent to a silane coupling agent using a diazo linkage (i.e. γ-aminopropyltriethoxysilane). The silane coupling agent, in turn, is bonded to the inorganic carrier.

The compositions defined by Schucker have many disadvantages. Initially, the method of making the compositions disclosed by Schucker inherently limits the types of compounds that can be utilized in the composition. For example, the only chelating agents that can be used are certain specific compounds having an unsaturated ring structure. Furthermore, because the chelate and the silane coupling agent are bound by a diazo linkage, only compounds capable of forming such a linkage can be used to produce the composition Furthermore, the Schucker process for making the compositions is a five step process. The large number of steps required can result in decreased capacities (i.e., the amount of metal the composition is capable of chelating) due to the aggregate inefficiency of the chemical reactions utilized to produce a given composition. Lastly, the Schucker compositions are not capable of separating individual metals and, therefore, are not useful in metal recovery processes which seek to recycle individual metals back into the manufacturing process from which they came. Accordingly, there is a need for more cost efficient processes for the separation and removal of heavy metal and/or rare earth metals from waste streams by producing compositions having a variety of chelating agents which are specific and selective toward desired metal ions.

SUMMARY OF THE INVENTION

The present invention relates to the preparation and use of chemically active ceramic compositions for separating heavy metal ions from solutions, especially aqueous waste streams. More particularly, the present invention relates to novel compositions that have very high capacities for chelating heavy and/or rare earth metals and can be readily designed to selectively remove individual metals. Furthermore, the present invention relates to methods of making and using those compositions.

One embodiment of the present invention comprises a composite material having the formula:

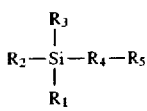 (I)

wherein at least one of $R_1$, $R_2$ and $R_3$ are SUPPORT—O— and other of $R_1$, $R_2$ and $R_3$ are the same or different and are unsubstituted or halosubstituted hydrocarbon chains having 1–5 carbon atoms and $R_4$ is:

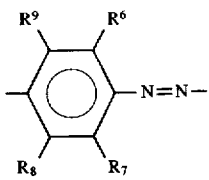

wherein $R_6$–$R_9$ are the same or different and are —H or —$(CH_2)_a CH_3$ wherein a is 0–20; or —$[(CH_2)_b$—$NH]_c$-$(CH_2)_d$— wherein b is 1–5, and c and d are the same or different and are 1–20; or

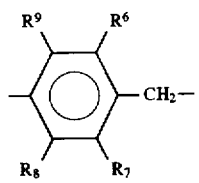

wherein $R_6$–$R_9$ are as defined above; and $R_5$ is

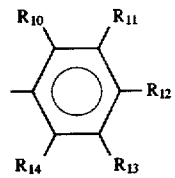

wherein up to three of $R_{10}$–$R_{13}$ are —OH and other of $R_{10}$–$R_{13}$ and $R_{14}$ are —H. In a second embodiment, the composite material of the present invention has the formula:

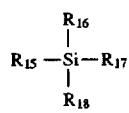 (II)

wherein either (a) $R_{15}$ is SUPPORT—O— and $R_{16}$ through $R_{18}$ are each

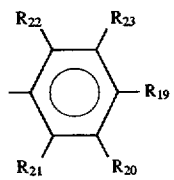

and at least one of said $R_{19}$ groups is

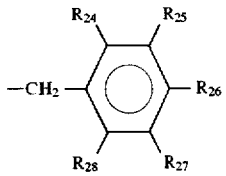

and other of said $R_{19}$ groups is —H, —$CH_2Cl$, or —$(CH_2)_a CH_3$ wherein a is an integer between 0–20; or (b) $R_{15}$ is SUPPORT—O— and one of $R_{16}$–$R_{18}$ is an alkyl group having 1 to 5 carbon atoms and other of $R_{16}$–$R_{18}$ are:

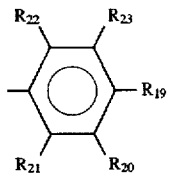

and one or both of said $R_{19}$ groups are

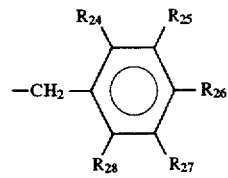

and other of said $R_{19}$ groups is —H, —$CH_2Cl$, or —$(CH_2)_a CH_3$ wherein a is an integer between 0–20; or (c) $R_{15}$ and $R_{16}$ are SUPPORT—O— and $R_{17}$ and $R_{18}$ are

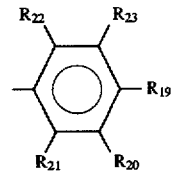

and one or both of said $R_{19}$ groups are

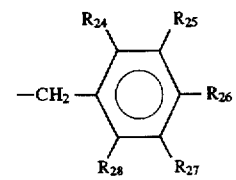

and other of said $R_{19}$ groups is —H, —$CH_2Cl$, or —$(CH_2)_a CH_3$ wherein a is an integer between 0–20; wherein $R_{20}$–$R_{23}$ are the same or different and are —H or —$(CH_2)_a CH_3$ wherein a is 0–20, and up to three of $R_{24}$–$R_{27}$ are —OH and other of $R_{24}$–$R_{27}$ and $R_{28}$ are —H.

In a third embodiment, the composite material of the present invention has the formula:

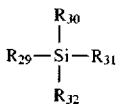

wherein either (a) $R_{29}$ is SUPPORT—O— and $R_{30}$ through $R_{32}$ are each

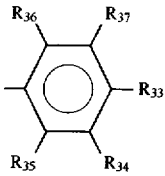

and up to three of said $R_{33}$ groups are

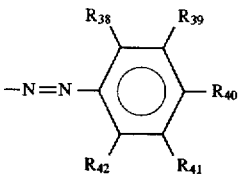

and other of said $R_{33}$ groups is —$NH_2$; or (b) $R_{29}$ is SUPPORT—O— and one of $R_{30}$–$R_{32}$ is an alkyl group having 1 to 5 carbon atoms and other of $R_{30}$–$R_{32}$ are:

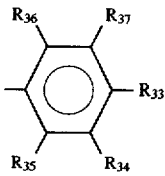

and up to two of said $R_{33}$ groups are

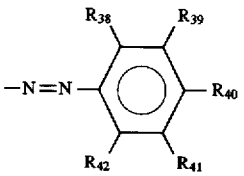

and up to one of said $R_{33}$ groups is —$NH_2$; or (c) $R_{29}$ and $R_{30}$ are SUPPORT—O— and $R_{31}$ and $R_{32}$ are

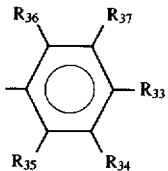

and one or both of said $R_{33}$ groups are

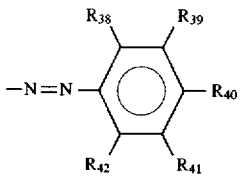

and up to one of said $R_{33}$ groups is —$NH_2$; wherein $R_{34}$–$R_{37}$ are the same or different and are —H or —$(CH_2)_aCH_3$ wherein a is 0–20, and up to three of $R_{38}$–$R_{41}$ are —OH and other of $R_{38}$–$R_{41}$ and $R_{42}$ are —H.

DETAILED DESCRIPTION OF THE INVENTION

Figure 1:
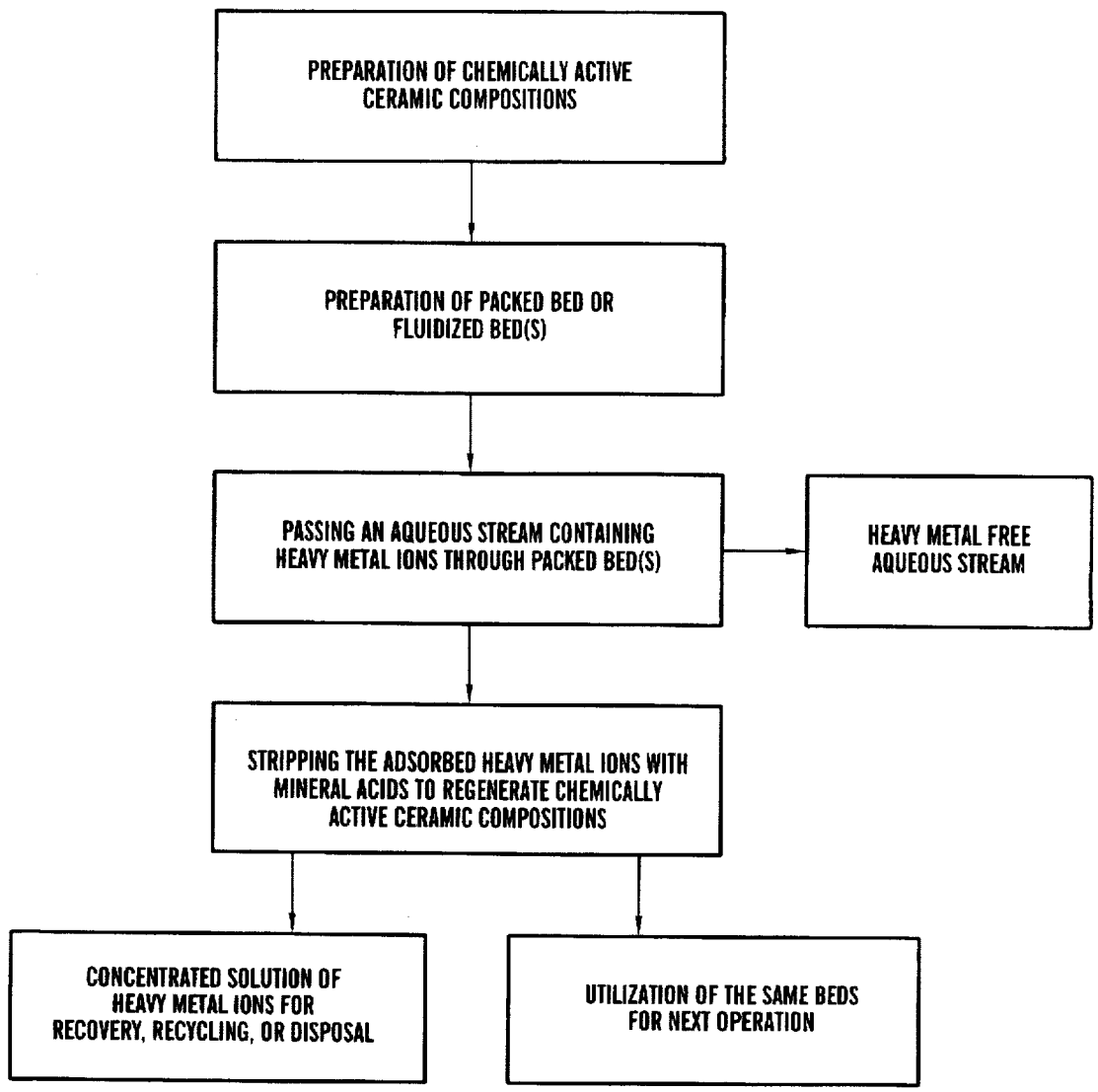
FIG. 1 is a flow chart of the process for separation and recovery of heavy metal ions with chemically active ceramic compositions.

The present invention relates to the preparation and use of chemically active ceramic compositions for removing metal ions from liquid streams, especially aqueous waste streams. More particularly, the present invention relates to various compositions that have very high capacities for chelating heavy and/or rare earth metals and can be readily designed to selectively remove individual metals. Furthermore, the present invention relates to methods of making and using those compositions.

The ceramic inorganic carriers useful to prepare the compositions of the present invention are those ceramic materials having terminal hydroxy groups. For example, alumina, titanium oxide, zirconium oxide, and silica-alumina are all useful in the compositions of the present invention. Silica gels are preferred due to the high density of hydroxy groups per unit surface area, higher overall surface area, and varying particle size. The silica gels preferred for use in the present compositions are in the form of particles (e.g., beads) having a diameter generally in the range of 3 mesh (about 0.635 cm) to 270 mesh (about 53 µm), Tyler screen scale. Most preferably, the silica gel beads used in accordance with the present invention have a diameter in the range of 14 to 270 mesh, have surface area of about 350 to 600 m²/gm and pore sizes (diameters) of about 40 to 150 angstroms. For the purposes of the present invention, the inorganic carrier portion of the inventive composite materials shall hereafter be designated "SUPPORT". According to the present invention, chemical compounds used as linking groups (i.e., groups which attach the chelating agent to the support) provide a linking chain between the chelating agent and the support to effect covalent bonding. This linkage is achieved by covalently bonding one end of the linking group to the support and another end of the linking group to the chelation agent. In the former case, the covalent bond is formed after removal of the hydrogen from the hydroxyl groups of the support. The covalent bonding site on the support is designated herein as "SUPPORT—O—".

In one embodiment of the present invention, the composite material useful for removing heavy metals from solutions such as waste streams has formula (I) below:

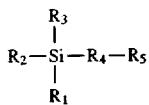
(I)

wherein at least one of $R_1$, $R_2$ and $R_3$ are SUPPORT—O— and other of $R_1$, $R_2$ and $R_3$ are the same or different and are unsubstituted or halosubstituted hydrocarbon chains having 1–5 carbon atoms and $R_4$ is:

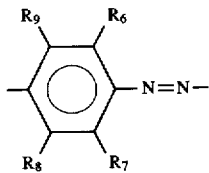

wherein $R_6$–$R_9$ are the same or different and are —H or —$(CH_2)_aCH_3$ wherein a is 0–20; or —[$(CH_2)_b$—$NH]_c$—$(CH_2)_d$—wherein b is 1–5, and c and d are the same or different and are 1–20; or

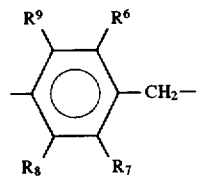

wherein $R_6$–$R_9$ are as defined above; and $R_5$ is

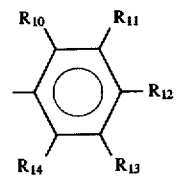

wherein up to three of $R_{10}$–$R_{13}$ are OH and other of $R_{10}$–$R_{13}$ and $R_{14}$ are H. Preferably, $R_{11}$, $R_{12}$, and $R_{13}$ are each OH and $R_{10}$ and $R_{14}$ are H and, most preferably, only one of $R_1$, $R_2$, or $R_3$ is SUPPORT—O—.

In a second embodiment, the composite material of the present invention has Formula (II) below:

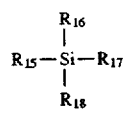
(II)

wherein either (a) $R_{15}$ is SUPPORT—O— and $R_{16}$ through $R_{18}$ are each

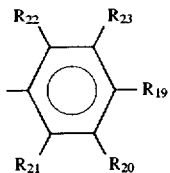

and at least one of said $R_{19}$ groups are

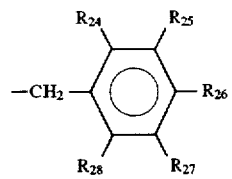

and other of said $R_{19}$ groups is —H, —$CH_2Cl$, or —$(CH_2)_aCH_3$; or (b) $R_{15}$ is SUPPORT—O— and one of $R_{16}$–$R_{18}$ is an allkyl group having 1 to 5 carbon atoms and other of $R_{16}$–$R_{18}$ are:

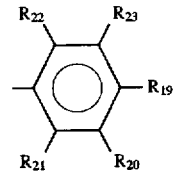

and one or both of said $R_{19}$ groups are

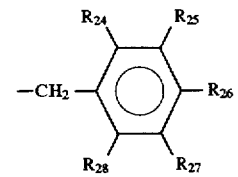

and other of said $R_{19}$ groups is —H, —$CH_2Cl$, or —$(CH_2)_aCH_3$; or (c) $R_{15}$ and $R_{16}$ are SUPPORT—O— and $R_{17}$ and $R_{18}$ are

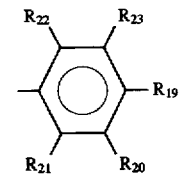

and one or both of said $R_{19}$ groups are

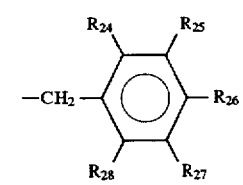

and other of said $R_{19}$ groups is —H, —$CH_2Cl$, or —$(CH_2)_aCH_3$; wherein $R_{20}$–$R_{23}$ are the same or different and are —H or —$(CH_2)_aCH_3$ wherein a is 0–20, and up to three of $R_{24}$–$R_{27}$ are —OH and other of $R_{24}$–$R_{27}$ and $R_{28}$ are —H. Preferably, $R_{25}$, $R_{26}$, and $R_{27}$ are each —OH and $R_{24}$ and $R_{28}$ are —H and, most preferably, only one of $R_{15}$ and $R_{16}$ is SUPPORT—O—.

In a third embodiment, the composite material of the present invention has Formula (III) below:

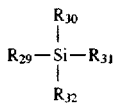
(III)

wherein either (a) $R_{29}$ is SUPPORT—O— and $R_{30}$ through $R_{32}$ are each

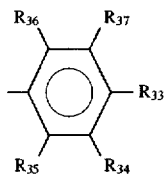

and up to three of said $R_{33}$ groups are

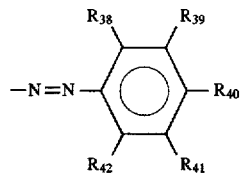

and other of said $R_{33}$ groups is —NH$_2$, or (b) $R_{29}$ is SUPPORT—O— and one of $R_{30}$–$R_{32}$ is an alkyl group having 1 to 5 carbon atoms and other of $R_{30}$–$R_{32}$ are:

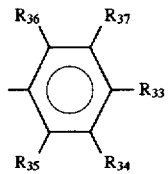

and up to two of said $R_{33}$ groups are

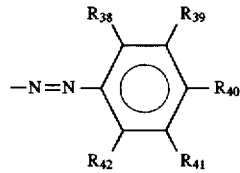

and other of said $R_{33}$ groups is —NH$_2$; or (c) $R_{29}$ and $R_{30}$ are SUPPORT—O— and $R_{31}$ and $R_{32}$ are

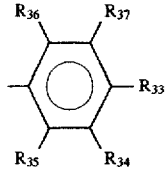

and one or both of said $R_{33}$ groups are

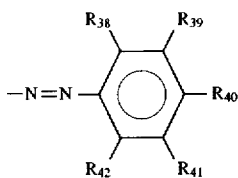

and up to one of said $R_{33}$ groups is —NH$_2$; wherein $R_{34}$–$R_{37}$ are the same or different and are —H or —(CH$_2$)$_a$CH$_3$ wherein a is 0–20 and up to three of $R_{38}$–$R_{41}$ are OH and other of $R_{38}$–$R_{41}$ and $R_{42}$ are —H. Preferably, $R_{39}$, $R_{40}$, and $R_{41}$ are each OH and $R_{38}$ and $R_{42}$ are —H and, most preferably, only one of $R_{29}$ and $R_{30}$ are SUPPORT—O—.

One method of producing the composites of the present invention is by diazocoupling pyrogallol or a pyrogallol derivative on the surface of the inorganic ceramic support. That method includes the step of first modifying the surface of the inorganic ceramic support by reacting it with an aminophenyl silane (e.g., aminophenyltrimethoxy silane, aminophenyltriethoxy silane). Next, a diazo group is placed on the aminophenyl modified support by reacting the modified support with sodium nitrite and hydrochloric acid or sodium nitrite and sulphuric acid. Then, diazo coupling of the modified support is completed with the diazo group and pyrogallol in a suitable solvent (e.g., methanol, ethanol, or a mixture of water and ethanol). In a preferred method, a 5–15 vol % solution of an aminophenyl silane in toluene is reacted with a ceramic support at 70–80 degrees Celsius. The aminophenyl modified support can then be diazotized with 0.2–4.0 molar sodium nitrite and 2–5 molar hydrochloric acid at 0–3 degrees Celsius for 2–6 hours. The diazotized ceramic support is then reacted with a 2–10 weight percent solution of pyrogallol in a 50 vol % mixture of water and ethanol, where the pH is adjusted to 7–10, at 0–3 degrees Celsius for 2–6 hours to effect covalent attachment of pyrogallol to the ceramic support.

Another method of making the composites of the present invention is by Friedel-Crafts alkylation of pyrogallol or a pyrogallol derivative by first preparing a chloromethyl derivative of pyrogallol. Next, a phenyl group is attached to the support by reacting the support with a phenyl-containing silane (e.g., chlorotribenzylsilyl chloride, triphenylsilyl chloride, methyl-diphenyl chlorosilane, benzyl-dimethylchlorosilane). Lastly, a Friedel-Crafts reaction is performed by reacting the (5-chloromethyl)-1,2,3-trihydroxybenzene with the phenyl-modified support or benzyl-modified support. Alternatively, a benzylchloride-modified ceramic support can be prepared by reacting the ceramic support with a benzyl chloride-containing silane (e.g., benzyl chloride trimethoxysilane or benzyl chloride trichlorosilane). The benzyl chloride-modified ceramic support is then reacted with pyrogallol or a pyrogallol derivative to effect covalent attachment to the ceramic support by Friedel-Crafts reaction.

A third way of producing the composites of the present invention is by producing an alkoxy-silane derivative of pyrogallol or a pyrogallol derivative. First, an allyl derivative of pyrogallol is prepared (e.g., (1-allyl)-3,4,5-trihydroxybenzene). Next, the allyl derivative is reacted with an alkoxy silane (e.g., trimethoxy silane, triethoxy silane) in the presence of a platinum catalyst and hexamethyldisilazane and trinethylchlorosilane (to protect hydroxy groups of pyrogallol) to produce an alkoxy-silane derivative. Accordingly, an allyl derivative of pyrogallol can be prepared by reacting pyrogallol with an allylhalide (e.g., allylbromide) in the presence of an anhydrous base (e.g., KOH, NaOH, $Na_2CO_3$) in a lower alcohol (e.g., methanol, ethanol) at about 60–80 degrees Celsius for about 2–6 hours. The resulting allyl derivative of pyrogallol dissolved in a suitable solvent (e.g., toluene) is reacted with an approximately 3 mole equivalent of hexamethyldisilane in the presence of trimethylchlorosilane in the presence of triethylamine. The resulting product can be isolated by removing excess solvent and reagent. The product is then reacted with about a two mole equivalent of trimethoxy- or triethoxy-silane in the presence of a platinum catalyst (e.g., $H_2PtCl_6$) at 40–60 degrees Celsius for 8–12 hours to form an alkoxy-silane derivative of pyrogallol. Next, the alkoxy-silane derivative is reacted with the support to covalently bond the alkoxy silane derivative to the support.

Diazocoupling is a preferred method of making the present composites. In one exemplary method, the ceramic support is reacted with a 2 to 10 volume percent ("vol %") solution of aminophenyl trimethoxysilane in toluene at 70°–80° C. for 12 to 15 hours. After completion of the reaction, the modified support is washed with toluene, methanol and acetone and dried at 50°–60° C. This aminophenyl modified support is further reacted with hydrochloric acid and sodium nitrite at 0°–3° C. for 2 to 4 hours. The pH of the pyrogallol solution is adjusted to 8 to 9 by adding dilute sodium hydroxide solution.

The compositions of the present invention have the capability of removing, in a selective manner, heavy metal ions in dilute solutions from aqueous streams. The compositions of the present invention in general can be used for removing from aqueous streams heavy metals such as antimony, arsenic, beryllium, cadmium, chromium, copper, lead, mercury, nickel, selenium, silver, thallium, tin, zinc, molybdenum, palladium, platinum, gold, cobalt, technetium, rhenium, cesium, strontium and rare earth metals such as cerium, neodymium, and praseodymium.

Typically, the compositions of the present invention are placed in packed beds or fluidized beds and the waste stream is passed through the bed. The compositions act to chelate with the unwanted metal ions, even if the ions are present in only dilute concentrations. Examples of useful beds for the chelating compositions described herein are found in U.S. Pat. Nos. 4,824,576 to Sood et al. and 4,448,694 to Plueddemann, the disclosures of which are hereby incorporated by reference.

Figure 2:
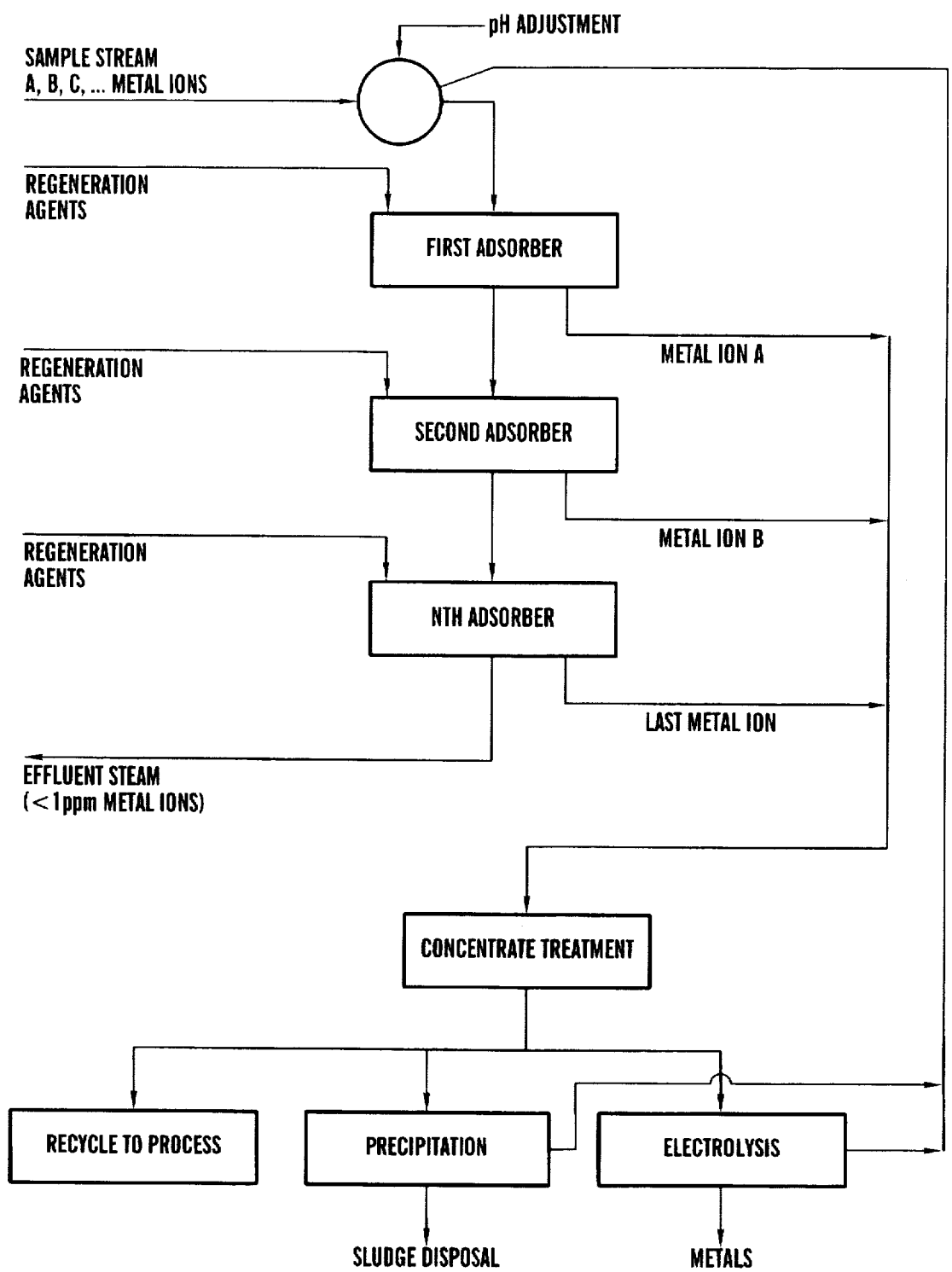
FIG. 2 is a flow chart illustrating the process of the invention by using different inventive compositions in a series of multiple adsorbent beds for metal ion separation and/or metal recovery.

The compositions of the present invention can be used for removal and recovery of heavy metal ions by a variety of methodologies as outlined by FIGS. 1 and 2. FIG. 1 is a process outline for separation and recovery of metal ions with chemically active inorganic carriers. FIG. 2 is a flow sheet illustrating the process of the invention by using a series of multiple adsorbent beds for metal ion separation and/or metal recovery.

The process of metal ion removal of the present invention contemplates several modes of operation. Many factors are considered in choosing the appropriate methodology, including the composition of the aqueous stream to be treated, the industrial process through which the contaminated stream is generated, the desired purification level of the aqueous stream, the degree of separation of metal ions from the waste stream desired, and the end use of the effluent from the bed.

In one embodiment of the present process, an operation mode can be employed to remove all metal ions simultaneously from an aqueous stream containing multiple metal ions by passing the stream through a single adsorbent packed bed or fluidized bed containing a composition according to the present invention. The column break-through volume (e.g., the volume at which minimum threshold concentration of metal ions in the effluent is exceeded) can be determined by monitoring the metal ion concentration in the effluent with an atomic absorption spectrophotometer, flow injection analysis, ion selective electrodes, or other known methods of metal ion concentration analysis and/or monitoring pH of the effluent.

The loaded column can be regenerated by desorbing the adsorbed metal ions from the column. The adsorbed metal ions can be recovered simultaneously by, for example, stripping all metals from a bed of chemically active silica gel with mineral acid (e.g., nitric acid, hydrochloric acid), as discussed supra. Upon regeneration, the chemically active inorganic carrier bed can be used for the next operation. The metal ion concentrate obtained during regeneration can be used to recover metals present by any one of two techniques or disposed of the metals as a sludge as illustrated in FIG. 2. In the first recovery method, the metals are recovered by electrolysis. The second method involves recycling the metal concentrate back to the process which first generated the polluted aqueous stream. In the third method, the metals can be precipitated to form sludge which can subsequently be disposed of in an environmentally safe manner.

In accordance with the present invention, it has been unexpectedly discovered that the efficiency of the removal process relative to certain metal ions is dependent on the pH of the aqueous stream. Therefore, as shown in FIG. 2, the pH of the stream can be advantageously adjusted if necessary (depending on the composite material used). This operation is typically performed by buffering an aqueous stream entering the bed of chemically active ceramic composition. Alternatively, instead of employing a buffer solution, it is possible to use a dilute ammonium hydroxide solution to simply adjust the pH of an acidic aqueous stream entering the packed or fluidized bed of chemically active inorganic carrier. In that case, because the materials of the invention are acidic in nature and release protons when they adsorb metal ions, the pH of the effluent stream decreases as additional bed volumes pass through the bed. The pH of the effluent stream decreases and reaches a minimum value whereby it becomes acidic. The inventive materials have a preferred pH band at which the adsorption efficiency for each metal ion is maximized. A pH below that pH is defined as acidic for the purposes of the present invention. At that pH, the adsorption of metal ions on the composite bed has been found to decrease. That point is termed the "breakthrough point" and can be determined by monitoring the pH of the effluent stream or monitoring the metal ion concentration in the effluent aqueous stream.

At the breakthrough point, the flow of aqueous stream through the bed can be stopped, and the bed can be made operational again by passing one or more bed volumes (i.e., an amount of fluid equal to the volumetric fluid capacity of the bed) of buffer solution through the bed. Buffering the column reestablishes the initial pH and extends the adsorptive life of the column and allows its use for the adsorption of metal ions until the column approaches its adsorption capacity (i.e., the point at which substantially all of the available sites for chelation of heavy metal ions are occupied) as determined by the breakthrough volume.

Adjusting the fluid stream pH with ammonium hydroxide (rather than using a buffer at the start) is highly advantageous because it decreases the cost of operation and minimizes the contamination of the effluent aqueous streams with buffer solutions, enabling environmentally safe disposition of the effluent. It is also possible to determine the breakthrough point by simply monitoring the pH of the effluent stream.

In another embodiment of the present process, all the metal ions in a waste stream containing more than one type of species of metal ion can be simultaneously removed by passing the waste stream through the single bed of chemically active inorganic carriers.

The selectivity of the inventive materials is highly advantageous. For example, a single metal ion from the aqueous stream containing multiple metal ions can be removed by passing the stream through a single packed or fluidized bed of the inventive composite materials where removal, recycling or disposal of only one metal ion is desired. The adsorbed metal ion can be desorbed from the bed of chemically active inorganic carrier with mineral acid. For example, a composite material as described above can be used to remove antimony(III) from the aqueous stream buffered to pH 6.5 and above. The adsorbed antimony can be recovered by stripping with a mixture of hydrochloric acid and potassium hydrogen tartrate and the regenerated bed can be utilized for the next operation. The metal ion concentrate can be used to recover, recycle or dispose of antimony using techniques such as electrolysis, recycling and precipitation, as discussed above.

As noted more specifically in the Examples (infra) certain of the inventive materials (e.g., the pyrogallol-containing composites) are capable of removing heavy metal ions for up to 68 (or more) bed volumes and have extraordinarily high adsorption capacities for antimony(III).

In another embodiment of the process of the present invention, metal ions can be separately and specifically removed by adsorbing those metal ions on a series of metal ion selective beds. As illustrated in FIG. 2, the metal ions can be removed in a sequential manner from the aqueous stream containing a mixture of multiple metal ions by passing the stream through the multiple beds where each bed contains an inventive composite that selectively removes one of the metal ions. The breakthrough point of the beds can be determined by monitoring the metal ion concentration in the effluent stream from the column by the methods discussed supra. These multiple beds can then be regenerated as described above and the metal ions removed from the bed can be recycled or disposed of.

Accordingly, the processes and materials of the present invention can completely remove and separate two distinct metal ions and facilitate maximum utilization of the beds' relative capacities, thereby providing valuable increased efficiency in the metal ion removal process.

The present invention is further described by the following non-limiting examples.

EXAMPLES

Example 1

A 5 vol % solution of aminophenyl trimethoxysilane in toluene as a silylating solution was prepared. Silica gel beads having a mesh size of 70–270 were reacted in the aminophenyl trimethoxysilane solution at a temperature of 70°–80° C. for 12 to 15 hours. The reacted silica gel beads were then washed with toluene, methanol and acetone and dried at 50°–60° C. The washed and dried silica beads were next contacted with hydrochloric acid (4.0M) and sodium nitrite (2.0M) at 0°–3° C. for 2 to 4 hours. The silica gel was then washed with cold water to remove excess acid.

A 5.0 vol % solution of pyrogallol (1,2,3-trihydroxybenzene) in a 5.0 vol % mixture of ethanol in water was prepared. The pH of the pyrogallol solution was adjusted to approximately 8–9 through the addition of dilute sodium hydroxide solution. The diazotized silica beads were then contacted with the pyrogallol solution at 0°–3° C. for 2–4 hours to effect covalent attachment of the pyrogallol on the aminophenyl-modified silica beads.

Example 2

Beads prepared according to Example 1 above were packed in a one centimeter ("cm") diameter column to a height of 10 cm. Aqueous solution containing antimony(III) ions at a concentration of 200 parts per million ("ppm") were flowed throughout the packed column at a flow rate of 1 milliliter per minute to provide approximately 10 minutes of residence or contact time between the solution and the chemically active silica gels. The aqueous solution was buffered at pH 6.5 using acetate buffer.

Figure 3:
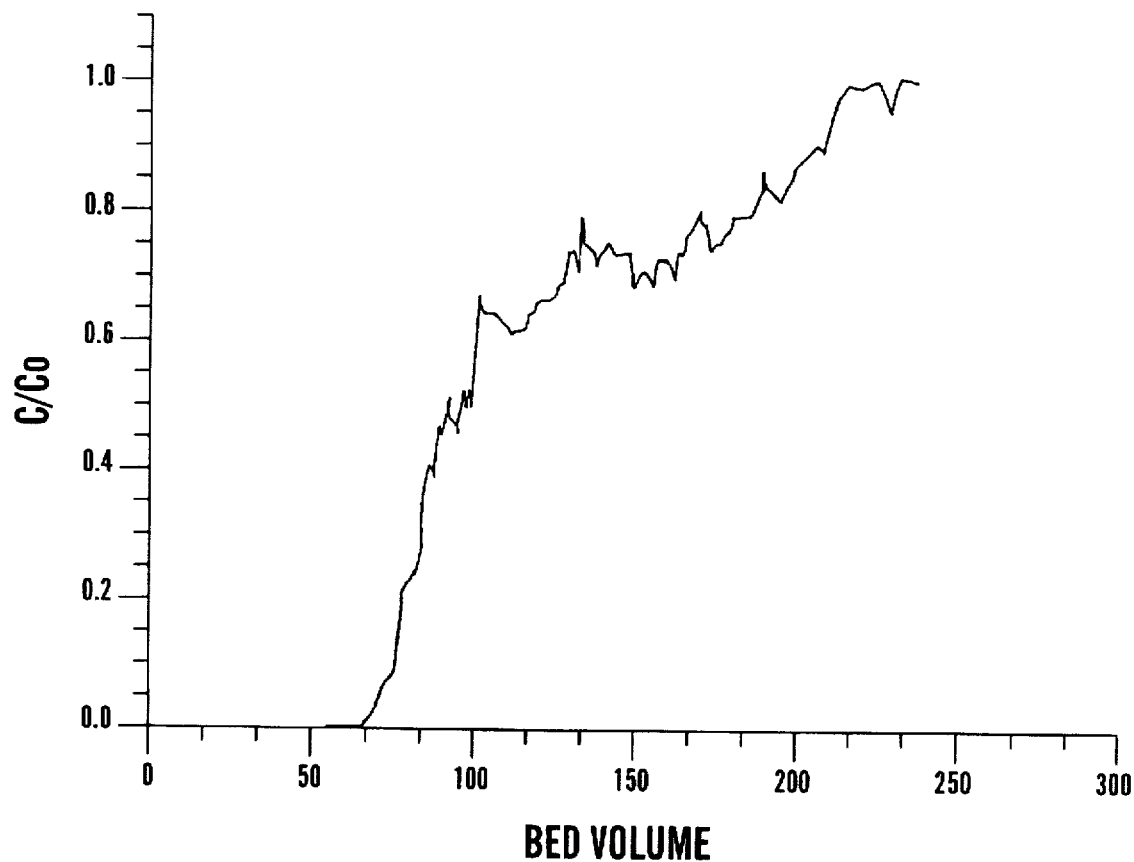
FIG. 3 illustrates the relationship between the ratio of antimony(III) ion concentration in an effluent stream to the antimony(III) ion concentration in a feed stream versus the bed volumes passed through a column of a composition prepared according to the present invention.
Figure 4:
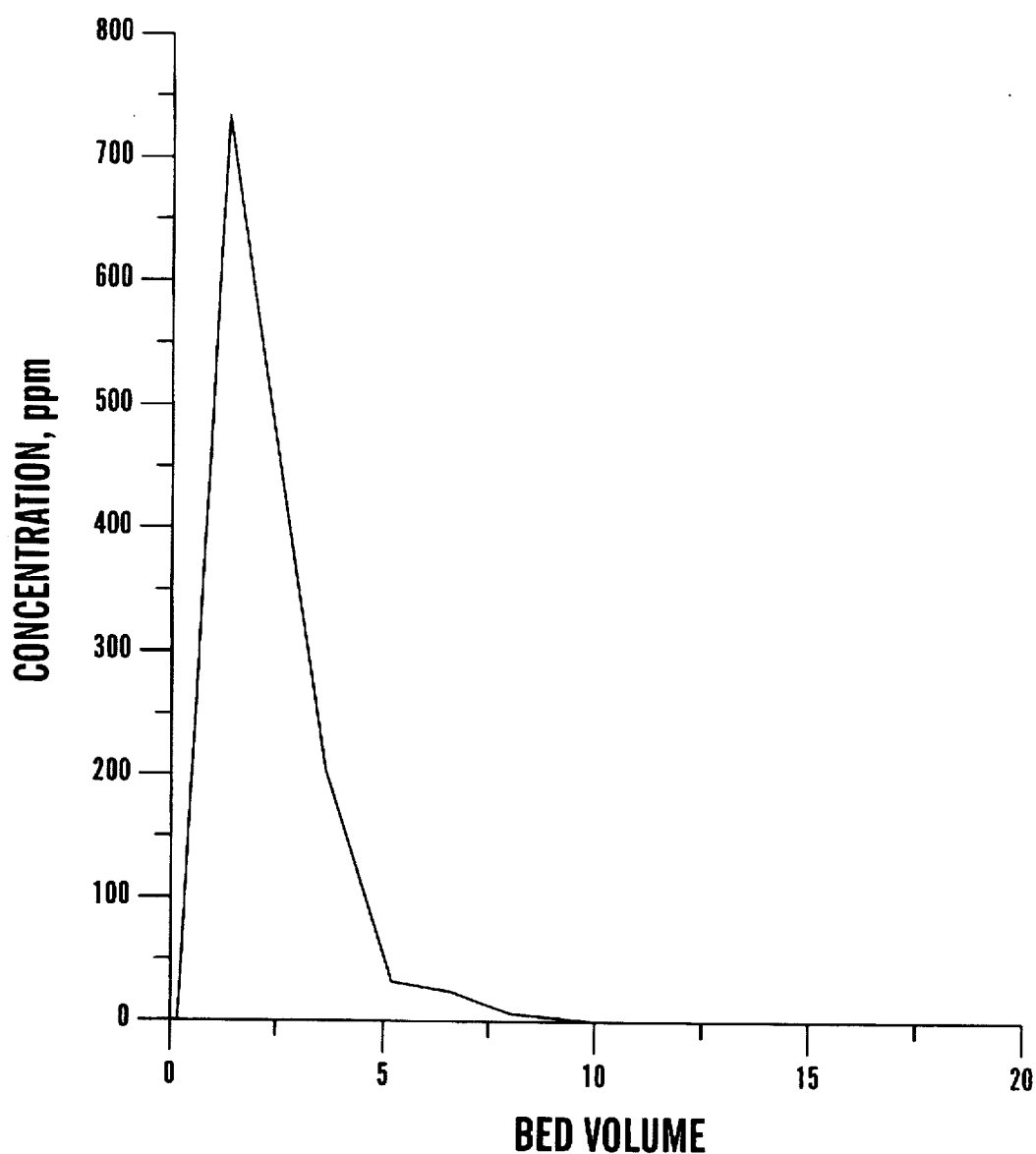
FIG. 4 illustrates the relationship between the ratio of antimony(III) ion concentration in an effluent stream versus the bed volumes of strip solution passed through a column of a composition prepared according to the present invention which is initially loaded with a known amount of antimony (III).

The capacity of the chemically active silica gel beads for antimony(III) was determined by collecting data to construct the breakthrough curve of FIG. 3 as follows. Accordingly, an aqueous solution containing antimony(III) ions was passed through the column at a flow rate of 1 ml/minute and the antimony(III) ion concentration in the effluent from the column was determined with an atomic absorption spectrophotometer. Thus, capacity of the ceramic compositions was calculated from the total amount of antimony ions adsorbed on the bed to saturation of the bed.

The capacity of the packed column was determined according to the procedures described above. The concentration of the effluent was measured periodically to determine the number of bed volumes that could be treated by the packed column before the beads were saturated and no longer removed the metal ion from the stream. The initial capacity was calculated at the end of the first period of saturation of the bed. Saturation is defined as a state after which no more metal ions are adsorbed on the bed. Thus, after saturation of the bed the concentration of metal ion in the solution entering the bed (feed solution) is, generally, equal to the concentration of metal ions in the solution coming out of the bed (effluent solution). The packed bed saturated with metal ions was then regenerated by stripping the metal ions from the packed bed using a low volume of mineral acids or a mixture of a mineral acid and an organic acid at predetermined concentrations. The combined sequence of saturation of the bed with the metal ions from the feed solution and regeneration of the bed by stripping the adsorbed metal ions from the synthesized adsorbents in the bed is denoted as one cycle of operation.

The fresh capacity of the Example 1 beads (i.e., the capacity after one cycle of operation) for antimony(III) was 43.14 mg/g. The packed column was fully regenerated by washing the column with about 5 bed volumes of a mixture of 4.0M hydrochloric acid and 0.05M potassium hydrogen tartrate. Upon regeneration, 97.9 weight percent of the original antimony(III) that was removed from the waste stream passed through the bed was recovered from the saturated beads.

Example 3

Example 3 illustrates the relationship between pH and the ability of the compositions of the present invention to remove various metals from solution. Example 3 also illustrates the selectivity of various of the compositions of the present invention under the appropriate conditions.

Composite materials prepared according to Example 1 were used to extract metal ions from aqueous solution having a metal concentration of 200 ppm. For each sample tested with a specific metal ion, three aqueous solutions, each of 25 ml, having different buffered pHs were equilibrated with one gram of sample for one hour during which time these materials were initially mixed on a shaker apparatus. In each case the percent extraction ("% Extraction") was determined by measuring the initial concentration of the given metal ion in the aqueous solution (before it was equilibrated with the samples) and the final concentration of the given metal ion in the aqueous solution (after it was equilibrated with the samples.) The data compiled according to these procedures are listed in Table I below.

TABLE I

| Metal Ion | pH | % Extraction |
|---|---|---|
| Lead(II) | 3.5 | 40.5 |
|  | 5.0 | 70.3 |
|  | 6.5 | 97.3 |
| Cadmium(II) | 3.5 | 6.70 |
|  | 5.0 | 14.40 |
|  | 6.5 | 31.89 |
| Antimony(III) | 1.0 | 82.10 |
|  | 5.8 | 82.68 |
|  | 9.0 | 90.42 |
| Copper(II) | 3.5 | 52.3 |
|  | 5.0 | 99.9 |
|  | 6.5 | 99.9 |
| Nickel(II) | 3.5 | 15.1 |
|  | 5.0 | 34.7 |
|  | 6.5 | 99.9 |

As illustrated by Table I, the material of Example 1 exhibits greater extractibility for lead ions at a pH of 6.5 and for antimony(III) at a pH greater than 9.0. For example, while the material removed only 40.5% of the lead(II) ions at pH 3.5, virtually all the lead(II) ions (97.3%) were removed at pH 6.5. The increased or decreased performance of the inventive materials relative to pH conditions can be advantageously exploited. For example, raising the pH of the waste stream as it enters the packed bed can significantly increase the performance of the bed and result in higher extraction percentages of the target heavy metals. The pH of the waste stream could also be manipulated to tailor the packed bed's extraction characteristics to the particular properties of the subject waste stream. More specifically, if a waste stream exhibited a large concentration of lead and a relatively lower concentration of cadmium, it would be advantageous to use a composition exhibiting a relatively higher selectivity for lead, such as the material of Example 1. When extracting lead or cadmium from such waste streams, the pH of the waste stream could be advantageously adjusted to a value at or above 6.5. At pHs of 6.5 or above, the inventive material would remove lead relatively preferentially as compared to the less prevalent cadmium, thus preventing premature saturation of the column with the less prevalent cadmium ions.

Although the present invention has been described in detail for the purpose of illustration, it is understood that such detail is solely for that purpose, and variations can be made therein by those skilled in the art without departing from the spirit and scope of the invention as described by the following claims.

What is claimed is:

1. A method of removing heavy metal ions from a liquid stream comprising the step of contacting the stream with a composite material under conditions effective to complex said heavy metal ions on said composite material, said composite material having the formula:

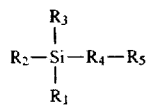

wherein at least one of $R_1$, $R_2$ and $R_3$ are SUPPORT —O— and other of $R_1$, $R_2$ and $R_3$ are the same or different and are unsubstituted or halosubstituted hydrocarbon chains having 1–5 carbon atoms and $R_4$ is:

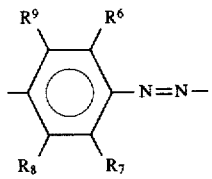

wherein $R_6$–$R_9$ are the same or different and are —H or —$(CH_2)_a CH_3$ wherein a is 0–20; or —$[(CH_2)_b$—$NH]_c$—$(CH_2)_d$—wherein b is 1–5, and c and d are the same or different and are 114 20; or

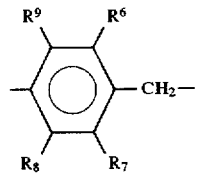

wherein $R_6$–$R_9$ are as defined above; and $R_5$ is

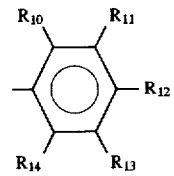

wherein up to three of $R_{10}$–$R_{13}$ are —OH and other of $R_{10}$–$R_{13}$ and $R_{14}$ are —H.

2. A method according to claim 1, wherein only one of $R_1$, $R_2$ and $R_3$ are SUPPORT —O—.

3. A method according to claim 2, wherein $R_{11}$, $R_{12}$, and $R_{13}$ are each —OH and $R_{10}$ and $R_{14}$ are —H.

4. A method according to claim 1, wherein $R_1$, $R_2$, and $R_3$ are SUPPORT—O—$_4$ is

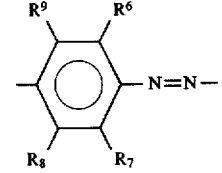

wherein $R_6$, $R_7$, $R_8$, and $R_9$ are —H, $R_{11}$, $R_{12}$ and $R_{13}$ are each OH and $R_{10}$ and $R_{14}$ are —H.

5. A method according to claim 4, further comprising adjusting the pH of said stream above 5.0, wherein said adjusting is prior to contacting said stream with said composite material.

6. A method according to claim 1, further comprising removing complexed metal ions from said composite material to regenerate said composite material.

7. A method according to claim 1, wherein said contacting step comprises flowing said stream through a single packed or fluidized bed containing said composite material for removal of a selected metal ion or metal ions from said stream.

8. A method as set forth in claim 7 in which a selected metal ion is Sb (III).

9. A method as set forth in claim 7 in which a selected metal ion is Pb (II).

10. A method as set forth in claim 7 in which a selected metal ion is Cd (II).

11. A method as set forth in claim 7 in which a selected metal ion is Cu (II).

12. A method as set forth in claim 7 in which a selected metal ion is Ni (II).

13. A method as set forth in claim 7 in which a selected metal ion is Zn (II).

14. A method as set forth in claim 7 in which a selected metal ion is Cr (III).

15. A method as set forth in claim 7 in which a selected metal ion is Th (IV).

16. A method as set forth in claim 7 in which a selected metal ion is Sr (II).

17. A method as set forth in claim 7 in which selected metal ions are U (VI), U (IV), or mixtures thereof.

18. A method according to claim 1, wherein said contacting step comprises flowing said stream through a first packed or fluidized bed containing said composite material and then through a second packed or fluidized bed containing said composite material, wherein said first packed or fluidized bed and said second packed or fluidized bed are arranged in series.

19. A method according to claim 18, wherein said first and said second packed or fluidized beds contain different composite materials exhibiting different metal ion removal preferences.

20. A method according to claim 18, wherein the pH of said stream is adjusted after leaving said first bed and before entering the second bed.

21. A method of removing heavy metal ions from a liquid stream comprising the step of contacting the stream with a composite material under conditions effective to complex said heavy metal ions on said composite material and breaking said complex to free and recover selected ion or ions, said composite material having the formula:

$$\begin{array}{c} R_{16} \\ | \\ R_{15}-Si-R_{17} \\ | \\ R_{18} \end{array} \quad (II)$$

wherein either (a) $R_{15}$ is SUPPORT-O— and $R_{16}$ through $R_{18}$ are each

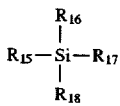

and at least one of said $R_{19}$ groups are

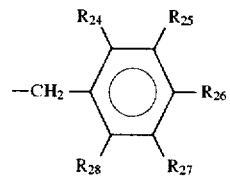

and other of said $R_1$ groups is —H, —CH$_2$Cl or —(CH$_2$)$_a$CH$_3$; or (b) $R_{15}$ is SUPPORT-O— and one of $R_{16}$-$R_{18}$ is an alkyl group having 1 to 5 carbon atoms and other of $R_{16}$-$R_{18}$ are:

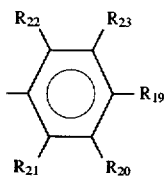

and one or both of said $R_{19}$ groups are

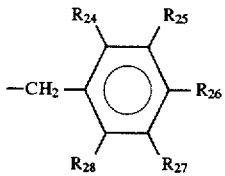

and other of said $R_{19}$ groups is —H, —CH$_2$Cl or —(CH$_2$)$_a$CH$_3$; or (c) $R_{15}$ and $R_{16}$ are SUPPORT-O— and $R_{17}$ and $R_{18}$ are

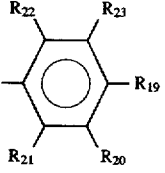

and one or both of said $R_{19}$ groups are

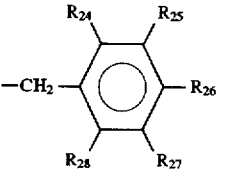

and up to one of said $R_{19}$ groups is —H, —CH$_2$Cl or —(CH$_2$)$_a$CH$_3$; wherein $R_{20}$-$R_{23}$ are the same or different and are —H or —(CH$_2$)$_a$CH$_3$, wherein a is 0–20, and up to three of $R_{24}$-$R_{27}$ are OH and other of $R_{24}$-$R_{27}$ and $R_{28}$ are H.

22. A method according to claim 21, wherein $R_{25}$, $R_{26}$, $R_{27}$ are each OH and $R_{24}$ and $R_{28}$ are H.

23. A method of removing heavy metal ions from a liquid stream comprising the step of contacting the stream with a composite material under conditions effective to complex said heavy metal ions on said composite material and breaking said complex to free and recover selected ion or ions, said composite material having the formula:

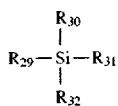

wherein either (a) $R_{29}$ is SUPPORT-O— and $R_{30}$ through $R_{32}$ are each

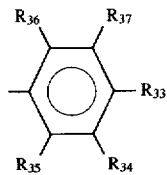

and up to three of said $R_{33}$ groups are

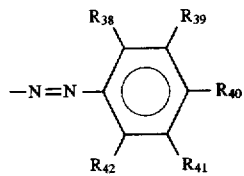

and other of said $R_{33}$ groups is —$NH_2$; or (b) $R_{29}$ is SUPPORT-O— and one of $R_{30}$-$R_{32}$ is an alkyl group having 1 to 5 carbon atoms and other of $R_{30}$-$R_{32}$ are:

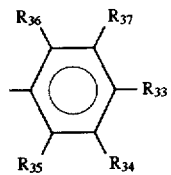

and up to two of said $R_{33}$ groups are

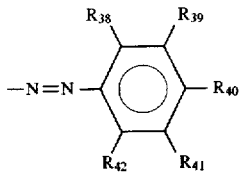

and other of said $R_{33}$ groups is —$NH_2$; or (c) $R_{29}$ and $R_{30}$ are SUPPORT-O— and $R_{31}$ and $R_{32}$ are

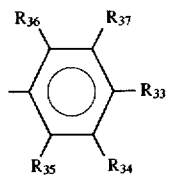

and one or both of said $R_{33}$ groups are

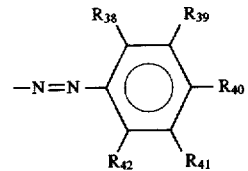

and up to one of said $R_{33}$ groups is —$NH_2$; wherein $R_{34}$-$R_{37}$ are the same or different and are —H or —$(CH_2)_aCH_3$, wherein a is 0–20, and up to three of $R_{38}$-$R_{41}$ are —OH and other of $R_{38}$-$R_{41}$ and $R_{42}$ are —H.

24. A method according to claim 23, wherein $R_{39}$, $R_{40}$ and $R_{41}$ are each —OH and $R_{38}$ and $R_{42}$ are —H.

* * * * *